United States Patent Office 3,172,728
Patented Mar. 9, 1965

3,172,728
PRODUCTION OF HIGH-PURITY SINTERABLE BERYLLIUM OXIDE
Carl W. Schwenzfeier, Fremont, and Carl S. Pomelee, Port Clinton, Ohio, assignors to The Brush Beryllium Company, Cleveland, Ohio, a corporation of Ohio
No Drawing. Filed July 28, 1960, Ser. No. 49,811
7 Claims. (Cl. 23—183)

This invention relates to the production of beryllium oxide and more specifically to production of beryllium oxide by the calcination of beryllium sulfate.

A prior method of producing beryllium ovide comprises calcining beryllium sulfate at about 900° C. to 1000° C. This process provides only limited production of beryllium oxide as small charges of beryllium sulfate must be employed. Even then, the beryllium oxide has unsatisfactory physical properties and chemical impurities objectionable for many purposes. For example, articles fabricated by room temperature compaction and subsequent sintering of the beryllium oxide products of said prior calcination process have objectionably low density. Chemical analysis of such products discloses objectionable quantities of residual sulfur-containing materials and other impurities such as boron, sodium, and lithium, which preclude the use in nuclear and other applications of articles fabricated from the oxide.

Furthermore, as mentioned, only limited quantities of even this impure low-density beryllium oxide are obtainable by the prior calcination process. If an attempt is made to increase the quantity of the beryllium sulfate starting material, the rise in the level of the furnace bed resulting from the larger quantity of beryllium sulfate causes the beryllium oxide to be produced in the form of agglomerates or large clinkers which require expensive time-consuming disintegration procedures prior to removal from tthe furnace. Thus the prior process is impractical for large-scale commercial operation and the production of high-purity beryllium oxide.

Furthermore, the oxide produced by said prior process could be fabricated into bodies of substantially theoretical density only by hot pressing methods, not by cold compaction and subsequent sintering.

The process embodying our invention eliminates these difficulties and provides commercial quantities of high-purity beryllium oxide capable not only of being hot pressed into desired shapes having substantially theoretical density, but also capable of being sintered to substantially theoretical density subsequent to room-temperature compaction.

It is an object of this invention to provide a process of producing high-purity beryllium oxide by which commercial quantities of the oxide can be produced without complicated equipment and procedures and without formation of agglomerates or clinkers in the furnace bed.

It is a further object of this invention to provide a process for the commercial production of high-purity beryllium oxide capable of being fabricated by room temperature compaction into desired shapes and subsequently sintered to substantially theoretical density while retaining the shapes imparted by the original compaction.

It is a still further object of the invention to provide a method of producing beryllium oxide substantially free from impurities which would render it undesirable for use in nuclear applications.

Other objects and advantages of the present invention will become apparent from the following description wherein a preferred embodiment of the invention is disclosed for purposes of illustration.

With these objectives in mind, a preferred process comprises intimately mixing with the beryllium sulfate, prior to calcination, an agent capable of rendering the calcined mass relatively friable and free from the agglomerates and clinkers such as produced in the prior processes. Preferably, the agent is a gas-forming agent and is present in an amount of between about 1% and 30%, by weight, of said sulfate. After mixing, the intimate mixture is calcined at about 875° C. up to about 1000° C.

The so-called gas-forming agent may be one or more substances capable of operating in situ during its intimate association with the beryllium sulfate during calcination without being eliminated prior to the effective temperature range during which it becomes operative. Also, it must be such that it does not cause residual contamination of the final product. After investigation of many such materials, those preferred have been found to be urea, ammonium oxalate, ammonium acetate and ammonium sulfate. While all these materials are capable of use in the process to provide a satisfactory product, urea is particularly desirable because of its low cost, ease of handling, and of admixture with the sulfate.

Gas-forming compounds containing nitrogen and hydrogen and which are not eliminated by vaporization below the temperature at which they become effective, and which do not leave residual materials to contaminate the final product, can be used. Thus many aliphatic organic compounds and aromatic organic compounds, each of which compounds contains both nitrogen and hydrogen, as well as inorganic compounds containing both of these elements, may be utilized in the practice of our invention.

The exact mechanism of the reaction of the process is not thoroughly understood, and the beneficial results may be due to physical or chemical phenomenon, or a combination thereof. For example, in the case of urea, it is uncertain whether the effect produced is due to gassing or some intermediate and temporary chemical reaction and resulting complex occurring before the calcination temperature is reached. However, regardless of absence of the urea at 100° C. and for a substantial range thereabove, as determined by X-ray analysis, the product obtained by calcination of the admixture of the urea and beryllium sulfate is decidedly different from that obtained by calcination of beryllium sulfate alone, being substantially pure, friable and free from agglomerates and clinkers. The primary requirement, in any event, is that the agent intimately mixed with the beryllium sulfate not be eliminated prior to the effective temperature range during which it becomes operative, and that it not leave any residual impurities in the final product.

The examples presented below are representative of the process of the invention, and are not to be considered as limitations thereof.

EXAMPLE 1

Fifty pounds of beryllium sulfate and five pounds of urea were intimately mixed, and the admixture then placed in saggers. The saggers were placed in a furnace and heated to attain a temperature of 920° C. which was then maintained for a 16-hour period. The furnace was then allowed to cool to 760° C., and the saggers were removed from the furnace and cooled to room temperature. The beryllium oxide obtained from this calcination was powdered and two charges sintered, one in air at 1500° C. and the other in a hydrogen atmosphere at 1600° C.

EXAMPLE 2

The same procedure as in Example 1 is followed with the exception that ten pounds of ammonium oxalate are intimately mixed with the fifty pounds of beryllium sulfate, in the initial step prior to calcining.

The tabular data presented below indicate the results obtained upon chemical analysis and physical testing of the products obtained from the calcination processes in Examples 1 and 2.

Table I

|  | Example 1 | Example 2 |
|---|---|---|
| BeO, percent* | 97.21 | 98.52 |
| B, p.p.m.* | 0.96 | 0.47 |
| Fe, p.p.m. | 4 | 4 |
| Al, p.p.m. | 40 | <40 |
| Ni, p.p.m. |  | <10 |
| Mn, p.p.m. | 5 | 3 |
| Cr, p.p.m. | <10 | <10 |
| Cd, p.p.m. | <1 | <1 |
| Li, p.p.m. | 1 | 1 |
| Mg, p.p.m. | 40 | 5 |
| Ca, p.p.m. | 20 | 200 |
| Co, p.p.m. | <1 | <1 |
| Cu, p.p.m. | <1 | <1 |
| Si, p.p.m. | 100 | 5 |
| Na, p.p.m. | 40 | 60 |
| Sintered Density: |  |  |
| In Air at 1,500° C | 2.75 | 2.93 |
| In H$_2$ at 1,600° C | 2.90 | 2.92 |
| SO$_4$ percent |  | 0.12 |

*The analytical results indicated by asterisks (*) are based on chemical analyses, and the remainder of the analytical data is derived from spectrographic analyses.

Table I indicates that the beryllium oxide product resulting from our process is of high purity and sinterable in either air or a hydrogen atmosphere after compaction at room temperature to substantially theoretical density.

Table II

| Urea:BeSO$_4$·4H$_2$O | Sintering Conditions | | Sintering Densities (g./cc.) | | Shrinkage | | Average Crystallite Size (A.) | L.O.I., 110° C.–1,000° C. |
|---|---|---|---|---|---|---|---|---|
|  | Temp. (° C.) | Atmos. | Green | Sintered | Dia. | Ht. |  |  |
| 0.1 lb:10 lb | 1,600 | H$_2$ | 1.78 | 3.04 | 17.5 | 16.1 | 1,700 | 0.28 |
|  |  |  | 1.79 | 2.93 | 15.9 | 15.9 |  |  |
|  | 1,500 | Air | 1.72 | 2.76 |  |  |  |  |
|  |  |  | 1.76 | 2.78 | 13.3 | 14.5 |  |  |
| 0.2 lb.:10 lb | 1,600 | H$_2$ | 1.81 | 2.89 | 15.7 | 15.4 | 1,400 | 0.31 |
|  |  |  | 1.73 | 2.83 | 16.6 | 15.7 |  |  |
|  | 1,500 | Air | 1.80 | 2.72 | 14.1 | 13.6 |  |  |
|  |  |  | 1.76 | 2.68 | 14.3 | 13.3 |  |  |
| 0.4 lb.:10 lb | 1,600 | H$_2$ | 1.68 | 2.93 | 17.7 | 17.8 | 1,200 | 0.39 |
|  |  |  | 1.74 | 2.95 | 17.2 | 16.9 |  |  |
|  | 1,500 | Air | 1.69 | 2.77 | 16.3 | 15.7 |  |  |
|  |  |  | 1.74 | 2.80 | 15.9 | 15.4 |  |  |
| 0.8 lb.:10 lb | 1,600 | H$_2$ | 1.68 | 2.89 | 17.3 | 17.1 | 1,025 | 0.48 |
|  |  |  | 1.74 | 2.92 | 16.7 | 16.8 |  |  |
|  | 1,500 | Air | 1.68 | 2.59 | 14.3 | 13.5 |  |  |
|  |  |  | 1.73 | 2.66 | 14.6 | 13.8 |  |  |
| 1.2 lb.:10 lb | 1,600 | H$_2$ | 1.70 | 2.94 | 17.8 | 17.3 | 925 | 0.64 |
|  | 1,500 | Air | 1.72 | 2.83 | 17.0 | 15.0 |  |  |

Table II shows that in the practice of our method, urea intimately mixed with beryllium sulfate in varied proportions will provide at each ratio indicated therein a beryllium oxide product sinterable to substantially theoretical density after room temperature compaction. The average crystallite size of the sintered product is increased as a lower ratio of urea to beryllium sulfate is used, and correspondingly decreased with the employment of higher percentages of urea.

The urea preferably is used in a range from about 1% to 15%, by weight, of the beryllium sulfate. The lower the percentage of urea, the greater is the average size of the crystallites of beryllium oxide. The higher limit of the range of urea can be exceeded without serious consequences in the final product. However, exceeding the higher range of urea renders the process more difficult of practice. Thus with the urea in the amount of about 20% by weight of the sulfate, although the material is easily handled when fired, the material expands about four times its original volume. Therefore, it is best to keep the amount of urea from about 12% to 15% of the sulfate as the normal operating upper limit. Above 30%, by weight, the increase in volume of the charge renders the operation somewhat impractical.

In the case of the ammonium oxalate, at amounts as great as 20%, by weight of the beryllium sulfate, fluidity becomes a problem, and amounts greater than 25% will render the mix too fluid for effective handling in loading the furnace.

Having thus described our invention, we claim:

1. A process of manufacturing beryllium oxide comprising the steps of intimately mixing with beryllium sulphate about 1% to about 30%, by weight of the beryllium sulphate, of an agent selected from the group consisting of urea, ammonium oxalate, ammonium acetate and ammonium sulphate, heating the admixture in the temperature range of about 875° C. to about 1000° C., maintaining the temperature within this range until said sulphate is calcined and thereby directly converted to beryllium oxide, said agent being capable of remaining in the mass until its operative temperature is reached, of rendering the beryllium oxide calcination product relatively friable and free from agglomerates and clinkers.

2. A process according to claim 1 wherein the agent is ammonium acetate.

3. A process according to claim 1 wherein the agent is ammonium sulfate.

4. A process of claim 1 wherein the agent is urea.

5. The process of claim 4 characterized further in that the urea is present in an amount of from about 1% to about 15%, by weight, of the beryllium sulfate.

6. A process according to claim 1 wherein the agent is ammonium oxalate.

7. The process of claim 6 further characterized in that the ammonium oxalate is present in an amount of from about 10% to about 25%, by weight, of the beryllium sulfate.

References Cited by the Examiner

UNITED STATES PATENTS 2,504,696   4/50   Kawecki _____ 23—140
2,974,012   3/61   Cooperstein et al. _____ 23—183

OTHER REFERENCES

Mellor: "Comprehensive Treatise on Inorganic and Theoretical Chemistry," Longmans, Green & Co., New York, vol. 4, pages 221 to 223 (1923).

MAURICE A. BRINDISI, *Primary Examiner.*

CARL D. QUARFORTH, *Examiner.*